United States Patent [19]

Swank

[11] Patent Number: 4,846,322

[45] Date of Patent: Jul. 11, 1989

[54] PARK POSITION SHIFT SELECTOR MECHANISM AND METHOD

[75] Inventor: David T. Swank, Millersburg, Ohio

[73] Assignee: The Fluorocarabon Company, Holmesville, Ohio

[21] Appl. No.: 140,439

[22] Filed: Jan. 4, 1988

[51] Int. Cl.⁴ ............................................. B60K 41/26
[52] U.S. Cl. .................................. 192/4 A; 74/473 R
[58] Field of Search ................. 74/473 R, 334, 337.5; 192/4 A, 4 R, 7

[56] References Cited

U.S. PATENT DOCUMENTS

| | | | |
|---|---|---|---|
| 2,821,275 | 1/1958 | Martin | 192/4 A |
| 3,241,640 | 3/1966 | McCordic et al. | 192/4 A |
| 3,361,234 | 1/1968 | Runyon | 192/4 A |
| 3,491,612 | 1/1970 | Adahan | 74/473 R |
| 3,519,111 | 7/1970 | Baldwin et al. | 192/4 A |
| 3,923,129 | 12/1975 | Rusch et al. | 192/4 B |
| 3,987,878 | 10/1976 | Hansen | 192/4 A |
| 4,004,665 | 1/1977 | Guhl et al. | 192/4 A |
| 4,054,181 | 10/1977 | Grosseau | 180/77 R |

Primary Examiner—Allan D. Herrmann
Assistant Examiner—Janice Chartoff
Attorney, Agent, or Firm—Fay, Sharpe, Beall, Fagan, Minnich & McKee

[57] ABSTRACT

A shift mechanism for use on vehicles with transmissions having no park gear, comprising a mechanism for shifting the transmission into neutral when the shift handle is moved to the park position and for applying a brake, said mechanism having a motion translator connecting the shift handle and transmission so that moving the shift handle from the reverse position, away from the neutral position and to the park position, shifts the transmission into neutral.

18 Claims, 4 Drawing Sheets

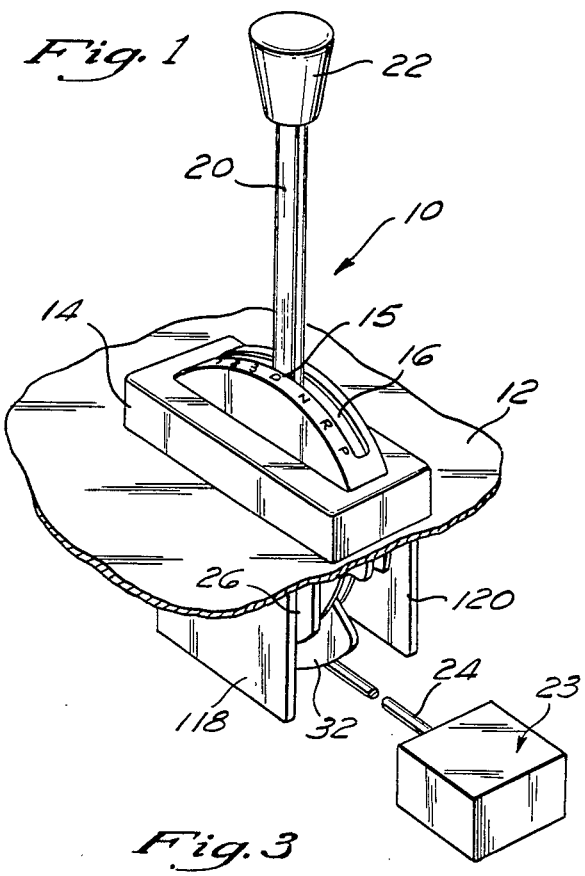
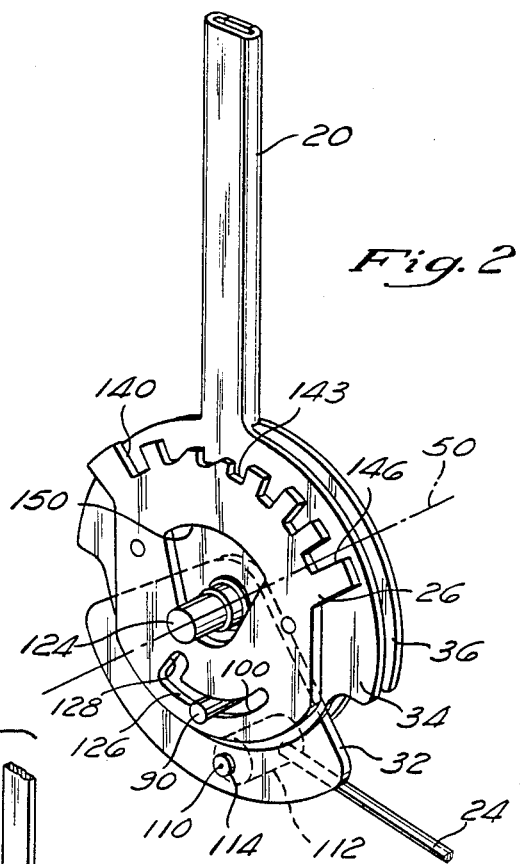
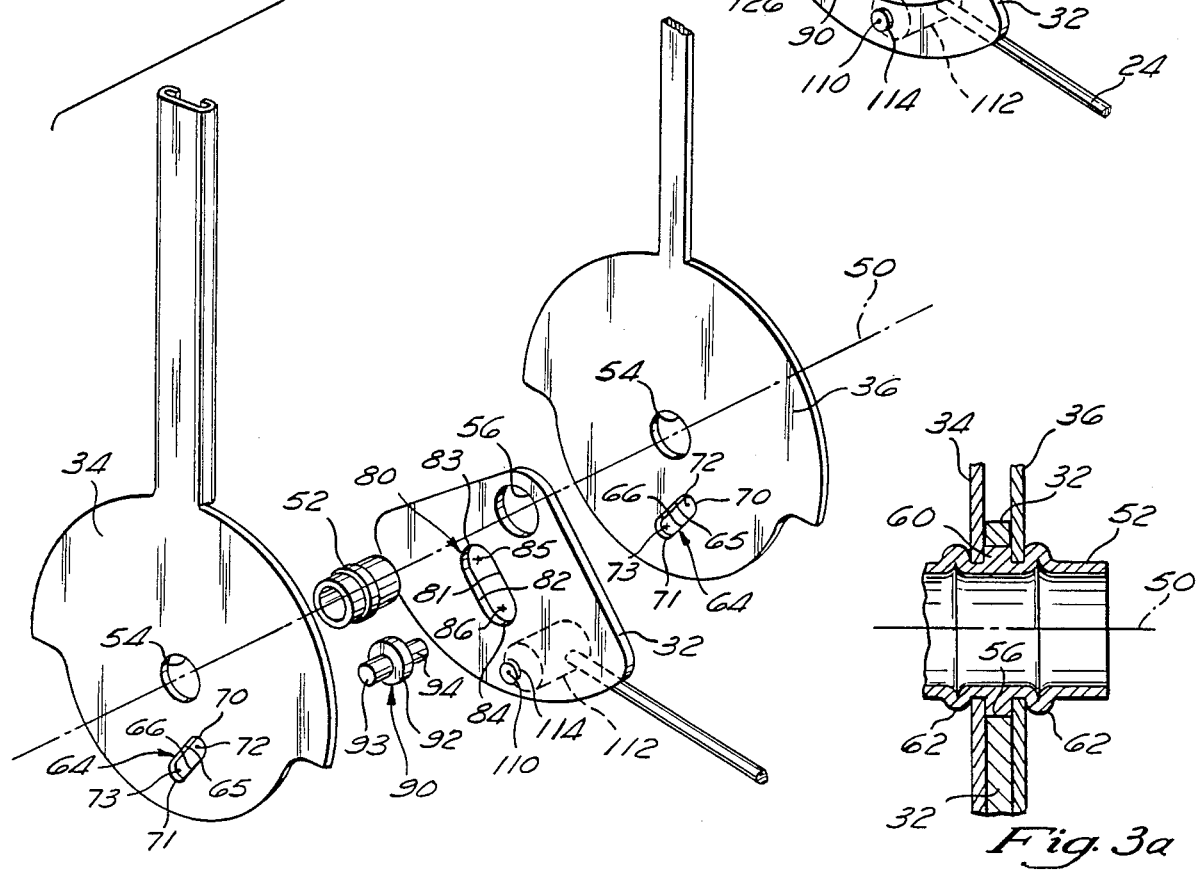

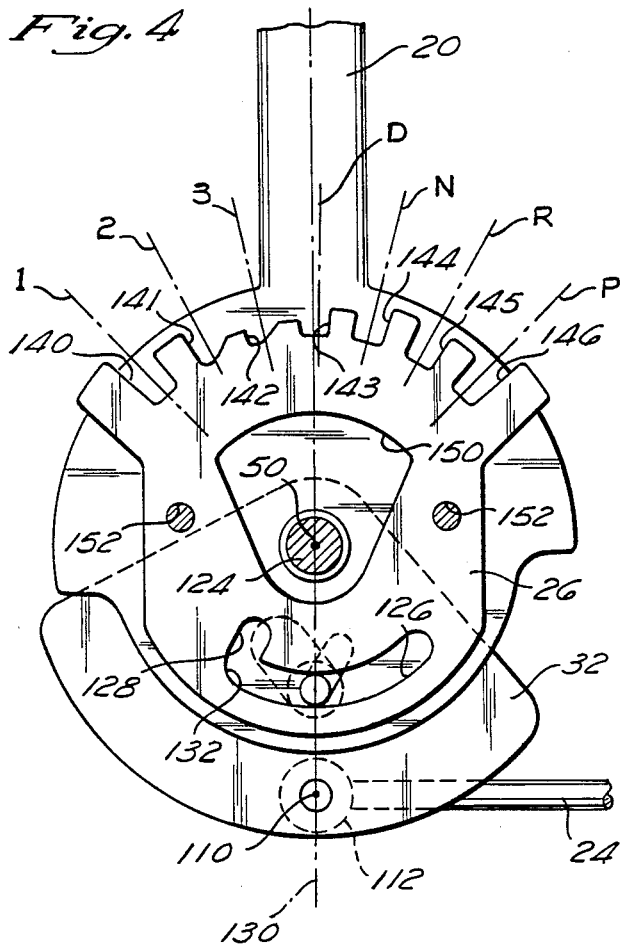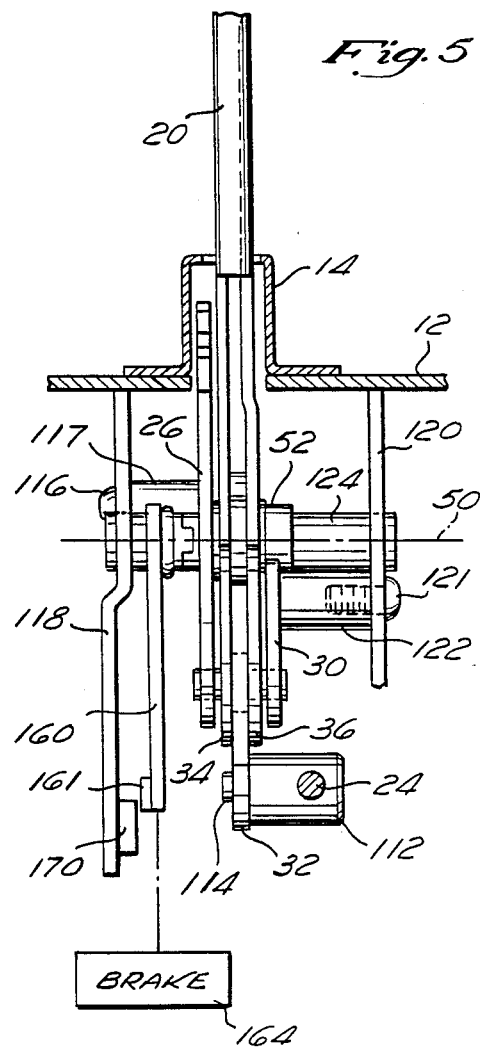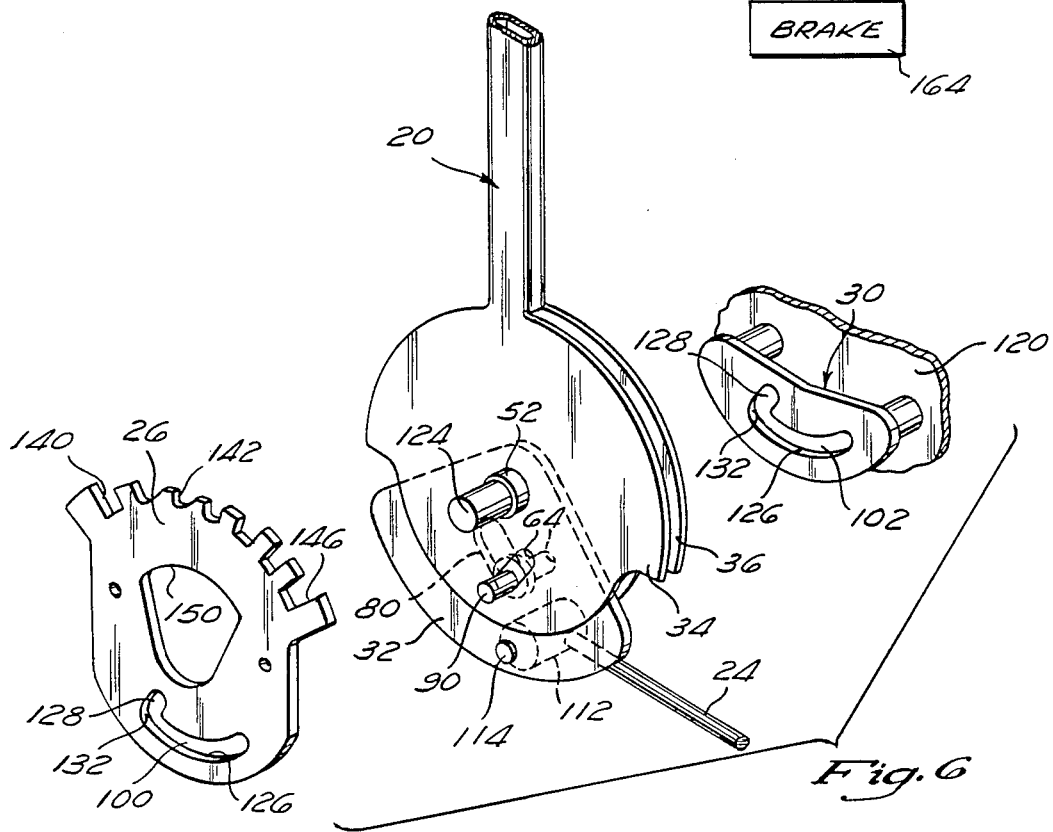

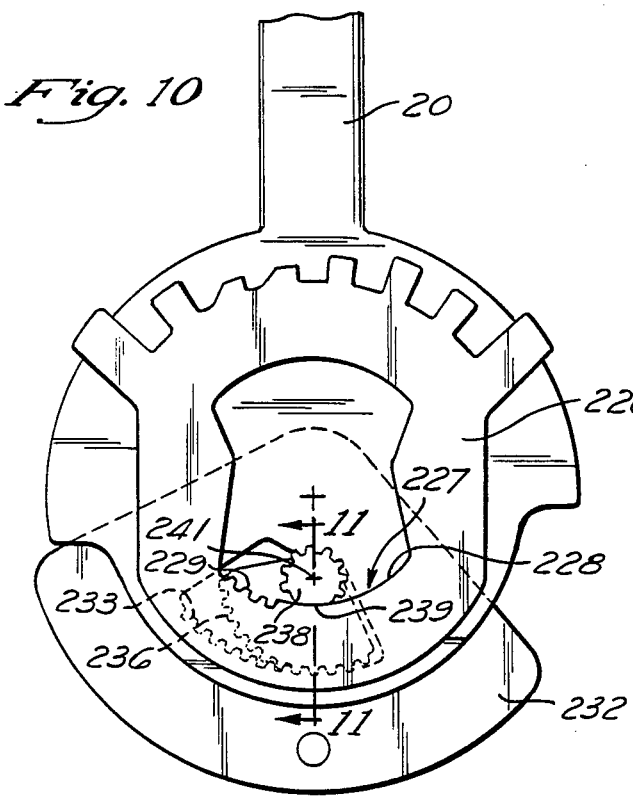
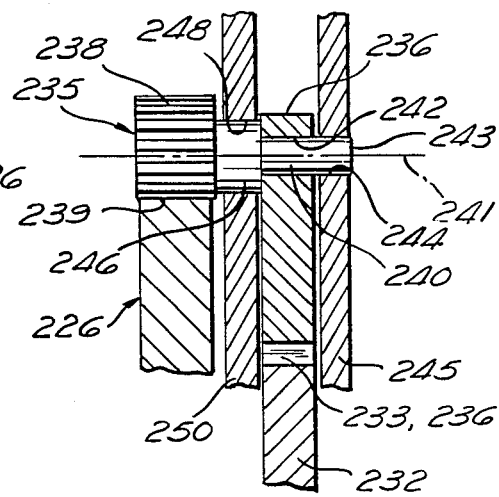

PARK POSITION SHIFT SELECTOR MECHANISM AND METHOD

BACKGROUND OF THE INVENTION

The present invention relates to a shift selector mechanism for use in vehicles with an automatic transmission having no park setting.

The most commonly used shift selector mechanism for passenger automobiles utilizes a shift selector with one or more drive positions, a reverse position, a neutral position and a park position. Selection of the park position places the automatic transmission into its park setting. In the park setting, the transmission output shaft is locked by means of a pawl or sprag, thereby preventing the vehicle from moving. Most medium and heavy duty vehicles having automatic transmissions, on the other hand, are equipped with transmissions having no park setting, because the loads are such that it is not practical to lock and unlock the larger transmissions in this fashion. Consequently, vehicles with such transmissions have shift selectors with no park position. This situation causes no problem for those used to driving such vehicles. In order to park the vehicle, the driver simply moves the shift handle to the neutral position and sets the vehicle brakes.

Not all drivers of medium and heavy duty vehicles with automatic transmissions are familiar with such transmissions, however. Unfamiliarity is particularly common among drivers of rental trucks and school buses. Absence of a park position may confuse a driver used to passenger vehicles having a shift selector park position and unfamiliar with vehicle shift selectors having no park position. The inexperienced driver may choose to place the shift handle into one of the drive or reverse positions when parking the vehicle. This choice tends to cause clutch/band load and wear. Some drivers may even select the dangerous alternative of moving the shift lever to neutral but then fail to apply the parking brake.

It has been suggested that, for such automatic transmissions not having a park position, there is a need for a system of returning the transmission to neutral and applying the vehicle park brake when a shift selector is moved into a park position. Such a system will prevent confusion of the driver unfamiliar with shift selector mechanisms having no park position and will minimize transmission clutch/band load caused by use of a drive or reverse gear when parked, and minimize risk of an unsafe, no-brake-applied condition.

SUMMARY OF THE INVENTION

There is provided for vehicles having transmissions without a park setting, a shift handle with a park position, selection of which places the automatic transmission into neutral. The preferred embodiment of the invention utilizes a system wherein the desired functions are provided within the shifter mechanism and does not introduce load to or require modification of the transmission. This permits the shift mechanism to be used with existing transmissions without affecting the vehicle operation. Repair and installation is also simplified with this approach. The shift handle or selector is connected to a transmission linkage in a manner such that, as the selector is moved from the selector reverse position to park position, the movement of the linkage is translated to be reversed and moved so as to place the transmission in neutral. In a preferred form of the invention, placement of the shift handle into the park position also actuates a vehicle brake.

In the preferred mechanism, the shift handle and a toggle plate to which the transmission linkage is attached are both arranged to rotate about a common axis. Both the shift handle and toggle plate have a slot, as do a pair of gates which are fixed in relation to the shift handle and toggle plate. The fixed slots are not straight like the others, but form a pair of opposing cam surfaces. A cam follower pin rides in the slots. The shape of the fixed cam slots is such that the shift handle and toggle plate rotate together through the drive, neutral and reverse positions. The fixed cam slots abruptly change direction between the reverse and park positions, causing reversal of rotation of the toggle plate with respect to rotation of the shift handle between shift handle position reverse and park. This reverse rotation returns the toggle plate and the transmission linkage member back to the neutral position as the shift handle is moved to the park position. Shifting of the handle into the park position thereby shifts the transmission into its neutral setting.

In accordance with the method of the invention, an automatic transmission having no park position is set by connecting a shift handle to the transmission so that moving the shift handle from the reverse position into the park position causes the linkage to the transmission to reverse and move the transmission into neutral. A preferred embodiment of this aspect of the present invention includes the step of reversing the linkage movement within the shifter mechanism. A further step includes connecting a brake to the shift lever so that the vehicle brake is set as the shift lever is moved into the park position.

Further objects, features and advantages of the present invention will become apparent from the Detailed Description of the Preferred Embodiment which follows, when considered together with the attached figures and claims.

BRIEF DESCRIPTION OF THE DRAWINGS

FIG. 1 is a perspective view of the shift selector mechanism of the instant invention as mounted on a vehicle floor with a housing.

FIG. 2 is a perspective view of the shift selector mechanism assembly without the housing and shift knob.

FIG. 3 is an exploded perspective view of the shift handle subassembly of the present invention.

FIG. 3a is a cross-sectional detail view of the hub in the shift handle subassembly of FIG. 3.

FIG. 4 is a side elevational view showing the shift selector mechanism of the present invention.

FIG. 5 is an end elevation view of the shift selector mechanism of FIG. 4.

FIG. 6 is an exploded perspective view of the shift handle cam subassembly and the gate and subgate.

FIG. 7b is a detail view of the cam arrangement in the position of FIG. 7a.

FIG. 8b is a detail view of the cam arrangement in the position of FIG. 8a.

FIG. 9b is a detail view of the cam arrangement in the position of FIG. 9a.

FIG. 10 is a side elevational view of a gear and rack alternate embodiment of the present invention.

FIG. 11 is an end elevational view of the shift selector mechanism of FIG. 10.

FIG. 12 is an exploded perspective view of the gear and rack alternate embodiment of the present invention.

DETAILED DESCRIPTION OF THE PREFERRED EMBODIMENT

Figure 7A:
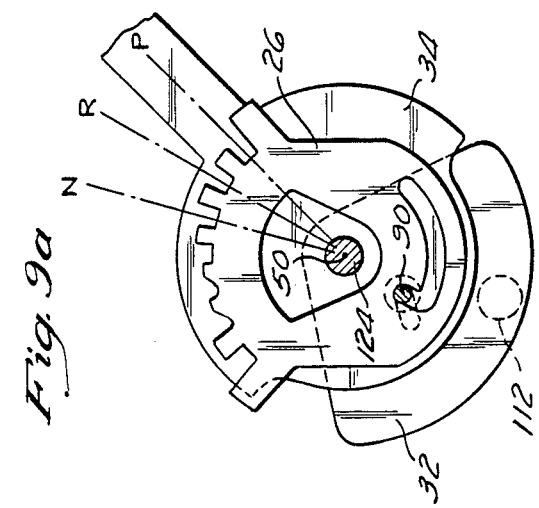
FIG. 7a is a side elevational view of the shift selector mechanism in the neutral position.

FIG. 1 shows the park position shift selector mechanism 10 of the present invention mounted on a vehicle floor 12. Mounted on top of the vehicle floor 12 is a shift housing 14 having marked thereon means 15 for visually indicating the position of the shift selector mechanism 10. Extending through a slot 16 in the shift housing 14 is the shift handle or selector 20, preferably topped by a shift knob 22. The park position shift mechanism 10 is attached to a conventional vehicle transmission 23 (shown in schematic representation) by means of conventional linkage member 24 which is typically a cable which accommodates by pushing and pulling forces. The cable typically connects to a lever (not shown) in the transmission which is moved to select the transmission settings.

Referring to FIGS. 2-6, the assembled shift selector mechanism 10 includes, in addition to the shift handle 20, a gate 26, subgate 30 and toggle plate 32. As shown in FIG. 6, the gate 26 is disposed on one side of shift handle 20, subgate 30 is disposed on the other side of shift handle 20, and toggle plate 32 is sandwiched between two shift handle paddle members 34, 36, which are connected by suitable means to form a unitary shift handle 20. Shift handle paddles 34, 36 are arranged to rotate with respect to toggle plate 32 about a central axis 50 defined by hub 52. Referring to FIG. 3, shift handle paddles 34, 36 have a central bore 54, and toggle plate 32 has a central bore 56 for receiving hub 52 in a rotatable fashion. Referring to FIG. 3a, toggle plate 32 is rotatably received on the central portion 60 of hub 52. Handle paddles 34, 36 are placed on either side of the toggle plate 32 on hub 52, which is swaged to form lips 62 which prevent the handle paddles 34, 36 from moving axially away from enlarged hub portion 60. This swaging acts to lock shift handle paddles 34, 36 to hub 52 so as to prevent relative rotation therebetween. The locking effect can be enhanced by cutting apertures into the handle paddles 34, 36 so that the swaged material of lips 62 is forced into the apertures. Hub central portion 60 preferably forms a loose running fit with toggle plate bore 56. Toggle plate 32 is preferably of a width slightly narrower than hub portion 60. Toggle plate 32 is therefore free to rotate about hub portion 60 and between first and second shift handle paddles 34, 36.

Figure 7B:
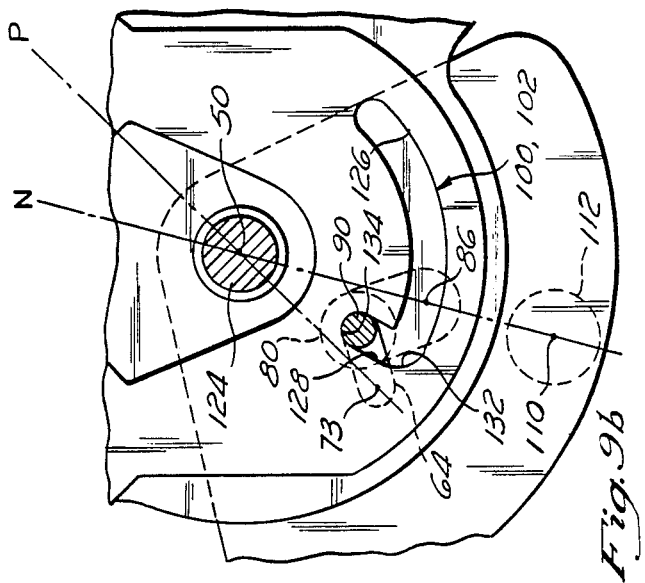

Shift handle paddles 34, 36 also have identical racetrack-shaped slots 64, having two substantially straight, parallel opposing sides 65, 66 connected at upper and lower ends 70, 71 by curves formed by radii extending from upper and lower centers 72, 73. As shown in FIGS. 7b, 8b and 9b, shift handle slot lower center 73 falls on the longitudinal axis of shift handle 20, which is shown as the line marked N in FIG. 7b, the line marked R in FIG. 8b and the line marked P in FIG. 9b. Central axis 50 also intersects the longitudinal axis of shift handle 20 in all three shift handle positions.

Toggle plate 32 has formed therein a racetrack-shaped slot 80. Toggle plate slot 80 has two substantially straight, parallel opposing sides 81, 82 connected at upper and lower ends 83, 84 by curves formed by radii extending from upper and lower centers 85, 86.

Generally cylindrical cam follower pin 90, having an enlarged central portion 92, is adapted to fit freely into toggle plate slot 80 and shift handle slots 64. Cam follower pin 90 has first and second ends 93, 94 extending beyond first and second shift handle paddles 34, 36. First cam follower pin end 93 is rotatably received by gate cam slot 100 in gate 26. Second cam follower pin end 94 is received by subgate cam slot 102 in subgate 30.

Transmission linkage member 24 can be attached to toggle plate 32 at various linkage attachment points depending on the movement and orientation desired for the linkage member or a push/pull cable 24. In the arrangement shown, the linkage is attached at point 110 by means of a block 112 which is rotatably attached to toggle plate 32 by means of fastener 114. Linkage attachment point 110 and the center of toggle plate bore 56 form a line, shown marked N in FIG. 7b, marked R in FIG. 8b, and marked N in FIG. 9b, on which falls lower center 86 of toggle plate cam slot 80; however, the attachment point need not be at that location.

Referring to FIGS. 4 and 5, gate 26 and subgate 30 are arranged in a spaced parallel relation to first and second handle paddles 34, 36. Gate 26 is fixed in position by fastener 116 and gate fastener dowel 117 attached to depending structural member 118. Similarly, subgate 30 is attached to depending structural member 120 by means of subgate fastener 121 and subgate fastener dowel 122.

Depending structural members 118, 120 support in a locking relation shaft 124, which is collinear with central axis 50 and is rotatably received by hub 52. Shift handle 20 and toggle plate 32 therefore rotate about shaft 124, their respective rotation being directed by the cooperation of cam follower pin 90 in shift handle slots 64, toggle plate slot 80, gate cam slot 100 and subgate cam slot 102. Shift handle slots 64 are straight slots oriented at an acute angle from the longitudinal axis of the shift handle 20. Toggle plate slot 80 is also a straight slot oriented at an acute angle from the handle axis with the handle positioned as in FIG. 4. As also shown in FIG. 4, shift handle slots lower center 73 is aligned with toggle plate slot lower center 86, and shift handle slots 64 are at opposing acute angles from the shift handle longitudinal axis, one on each side of that axis.

Gate and subgate cam slots 100, 102 are not straight, but instead each has an arcuate portion 126 and a radial portion 128. Arcuate portion 126 extends arcuately on either side of vertical axis 130, as shown in FIG. 4, about central axis 50, preferably extending through an arc of approximately 80°, approximately 45° in the counterclockwise direction, and a little less than 35° in the clockwise direction. The latter end of the slot could be open since the handle travel is limited by the end of slot 16 (FIG. 1). Cam slot radial portion 128 extends from the end 132 of cam slot arcuate portion 126, distal vertical axis 130 toward the center of shaft 124, which is defined by central axis 50. The width of radial portion 128 and arcuate portion 126 is constant throughout the length of gate cam slot 100 and subgate cam slot 102.

Gate 26 preferably has slots 140, 141, 142, 143, 144, 145, 146 formed in the top thereof to receive a ball, pin or other detent member in order to lock shift handle 20 into the position selected by the user. Gate slots 140–146 correspond to shift handle positions 1, 2, 3, D, N, R and P. Gate 26 also has a clearance aperture 150 to provide clearance for shaft 124 and hub 52. Gate 26 also is provided with gate mounting holes 152 for receipt of gate fastener dowel 117.

Referring to FIG. 5, mounted on shaft 124 and engaged with hub 52 is brake actuation lever 160, which is attached to the vehicle brake 164. Rotation of shaft handle 20 to the park position causes engagement of the vehicle brake, which acts on a suitable part of the vehicle such as the drive shaft or the wheels of the vehicle (not shown). Such a brake linkage arrangement is similar to parking brake arrangements on vehicles with manual transmissions, and needs no discussion here.

Also shown in FIG. 5 is a switch 170 attached to depending structural member 118 for activation by cam plate 161 attached to brake activation lever 160. Switch 170 may be a mechanical, electrical or optical detector as is commonly known in the art, and may be used to enable starting of the vehicle engine or to actuate the vehicle back-up lights, as is also commonly known in the art.

OPERATION

Selection of the transmission setting is directly effected by the change in position of the linkage attachment point on toggle plate 32. In the embodiment shown, linkage attachment point 110 is vertically aligned with the longitudinal axis of shift handle 20 for all shift handle positions except the park position. The relationship between the shift handle and the toggle plate 32 is controlled by cam follower pin 90 and gate cam slot 100, subgate cam slot 102, handle paddle slots 64 and toggle plate slot 80.

The longitudinal axis of shift handle 20 intersects the center of shift handle paddle bores 54, toggle plate bore 56 and lower center 73 of shift handle slots 64. This relationship remains constant regardless of shift handle position, but as mentioned above, the attachment need not be at the location shown. Different attachment points are used depending on the particular installation. In FIGS. 7b and 8b, the shift handle axis is shown intersecting the central axis of the cam follower pin 90, toggle plate slot lower center 86 and toggle plate linkage attachment point 110. These relationships remain constant for all shift handle positions except the park position. Moving the shift handle 20 past the reverse position toward the park position causes cam follower pin 90 to reach the end of fixed gate cam slot arcuate portion 126. Cam follower pin 90 is then free to move only back along arcuate portion 126 or along radial portion 128 toward shaft 124. Further movement of shift handle 20 toward the park position causes cam follower pin 90 to ride up from the bottom 71 of shift handle slots 64 and the bottom 84 of toggle plate slot 80, and move along cam slot radial portion 128 toward hub 52. Movement of cam follower pin 90 up radial cam slot portion 128 causes the horizontal component of the movement of cam follower pin 90 to be in the same direction as that of shift handle 20. By way of contrast, the horizontal component of the movement of cam follower pin 90 along cam slot arcuate portion 126 is always in a direction opposite that of shift handle 20. Movement of cam follower pin 90 to shift handle slot upper end 70 and toggle plate slot upper end 83, and the top 134 of cam slot radial portion 128 alters the relationship between the longitudinal axis of shift handle 20 and toggle plate linkage attachment point.

Movement of shift handle 20 between any of the drive, neutral or reverse positions causes movement of cam follower pin 90 in cam slot arcuate portion 126 and retention of cam follower pin 90 in a fixed position at the lower end 71 of shift handle slots 64 and the lower end 84 of toggle plate slot 80. Accordingly, between the shift handle drive, neutral and reverse positions, the toggle plate 32 rotates with and in the same direction of rotation as shift handle 20.

Radial movement of cam follower pin 90 toward shaft 124 and central axis 50, coupled with the relative angular orientation of shift handle slots 64 and toggle plate slot 80 causes toggle plate 32 to rotate with respect to, and in the opposite direction of, shift handle 20. This reverse rotation causes toggle plate linkage attachment point 110 to return to the same position as it occupies when shift handle 20 is in the neutral position, so that the transmission is returned to its neutral setting.

The shift mechanism of the present invention is operated just like the normal shift mechanism on a passenger automobile. The significant difference is that moving the shift handle from the reverse position and into the park position translates the movement of the handle to reverse the direction of movement of the transmission linkage and returns the transmission to the neutral setting instead of a park setting.

Shift handle 20 may be moved from the drive position, shown in FIG. 1, by releasing the detent mechanism (not shown) which engages gate slot 143. Clockwise movement of the handle from the drive position to the neutral position results in an arrangement shown in FIGS. 7a and 7b. With shift handle 20 in the neutral position, shaft 124 and the cam follower pin 90 are all located on the shift handle longitudinal axis marked N. Cam follower pin 90 rides at the lower end 84 of toggle plate slot 80, the lower end 71 of shift handle slots 64 and in cam slot arcuate portion 126. Clockwise movement of shift handle 20 about shaft 124 and central axis 50 to the neutral position cause clockwise rotation of toggle plate 32 about central axis 50, which acts to move linkage member 24 and shift transmission 23 from its drive setting to its neutral setting.

Figure 8A:
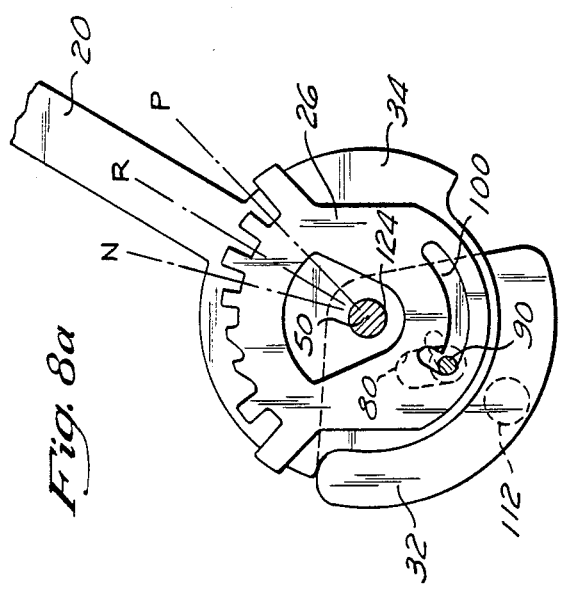
FIG. 8a is a side elevational view of the shift mechanism in the reverse position.
Figure 8B:
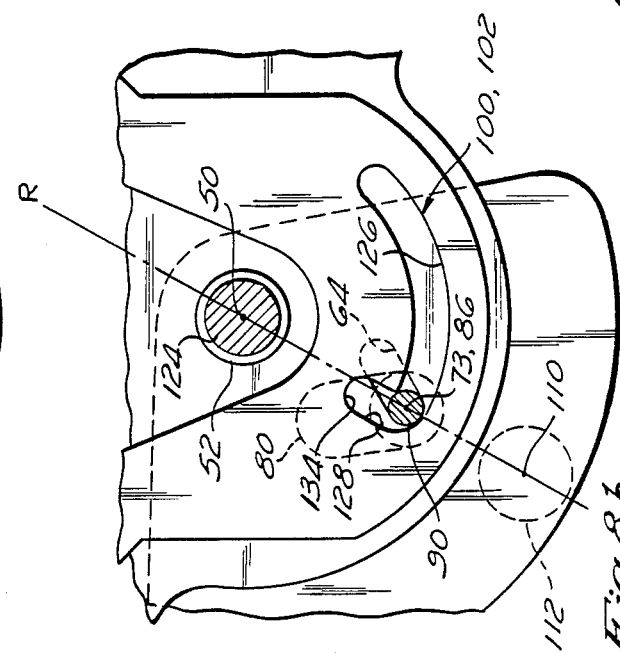

Clockwise movement of shift handle 20 to the reverse position has a similar effect, as shown in FIGS. 8a and 8b. Cam follower pin 90 stays at the lower end 84 of toggle plate slot 80, the lower end 71 of shift handle slots 64 and in gate cam slot arcuate portion 126, thereby maintaining the toggle plate linkage attachment point 110 on the shift handle longitudinal axis marked R. Clockwise movement of shift handle 20 about shaft 124 and central axis 50 from the neutral to the reverse position therefore results in clockwise movement of the toggle plate 32 and its linkage attachment point. That clockwise movement acts to move linkage member 24 and shift transmission 23 from its neutral setting to its reverse setting.

Figure 9A:
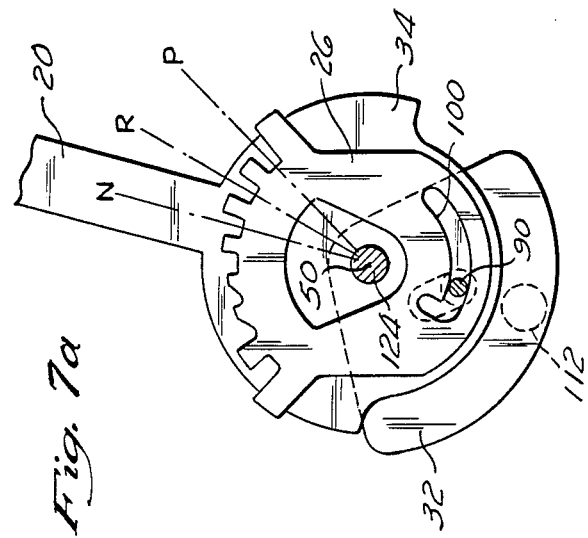
FIG. 9a is a side elevational view of the shift mechanism in the park position.
Figure 9B:
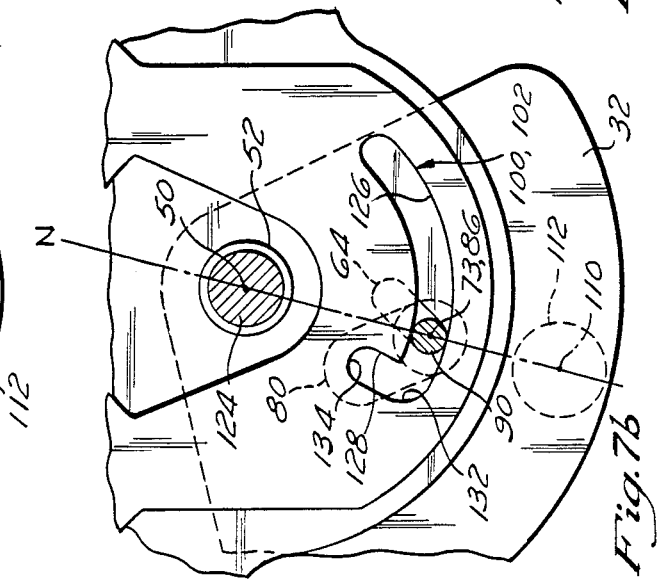

Clockwise movement of shift handle 20 from reverse to park has a different effect, as shown in FIGS. 9a and 9b. Cam follower pin 90 rides to toggle plate slot upper end 83 and to shift handle slot upper end 70. This changes the angular orientation between the shift handle longitudinal axis marked P, cam follower pin 90 and the toggle plate 32. Pin 90 is no longer aligned with the shift handle longitudinal axis, as in all the other shift handle positions. Cam follower pin 90 is directed by cam slots 100, 102 in a direction radially toward shaft 124. This movement causes the toggle plate 32 to rotate about shaft 124 and central axis 50 in a counterclockwise direction, opposite that of shift handle 20. In other words, clockwise rotation of shift handle 20 from reverse position to park position causes reverse or counterclockwise rotation of the toggle plate linkage attachment point from its reverse position back to its neutral position.

Counterclockwise rotation of shift handle 20 out of the park position and into the reverse position causes cam follower pin 90 to be moved to the toggle plate slot lower end 84 and shift handle slot lower end 71, and move from gate cam slot radial portion 128 to gate cam slot arcuate portion 126. This causes the illustrated toggle plate linkage attachment point 110 and cam follower pin 90 to become aligned with the shift handle longitudinal axis. In so doing, the toggle plate 32 rotates in a reverse or clockwise direction, returning the toggle plate to the reverse position.

FIGS. 10–12 show an alternate embodiment using pinion gears and gear racks instead of a cam follower pin and slots. The components of this embodiment include gate 226, which has an internal arcuate surface 227 comprising a smooth portion 228 and an internal arcuate gear rack 229, toggle plate 232, which has an internal arcuate gear rack 233, gate pinion gear 235, and toggle pinion gear 236. Gate pinion 235 has a gear portion 238 with a flat side 239 and a shaft portion 240 coaxial therewith on axis 241. Toggle pinion 236 has a hole 242 for receiving gate pinion shaft 240 therethrough in a press-fit relation. The end 242 of gate pinion shaft 240 extends beyond toggle pinion 236 and is rotatably received by hole 244 in shift handle paddle 245. Between gate pinion gear portion 238 and shaft portion 240 is gate pinion collar portion 246, which is rotatably received by hole 248 in shift handle paddle 250.

Rotation of shift handle 20 between the drive, neutral and reverse positions causes the flat side 239 of gate pinion gear portion 238 to slide along the smooth portion 228 of gate internal arcuate surface 227 so that gate pinion 235 does not rotate about axis 241. Concomitantly, toggle pinion 236 does not rotate about axis 241. Because toggle pinion 236 is engaged with toggle plate internal gear rack 233, toggle plate 232 does not rotate in relation to shift handle 20, but instead rotates about shaft 124 and central axis 50 along with shift handle 20. Clockwise rotation of shift handle 20 results in clockwise rotation of toggle plate 232 and counterclockwise rotation of shift handle 20 results in counterclockwise rotation of toggle plate 232.

Clockwise rotation of shift handle 20 past the reverse position to the park position causes gate pinion gear 235 to engage internal arcuate gear rack 229 on gate 226 and rotate in the counterclockwise direction. Toggle pinion gear 236, which is engaged with toggle plate internal gear rack 233, rotates in the counterclockwise direction along with gate pinion gear 235, thereby rotating the toggle plate 232 in the counterclockwise direction. Despite the clockwise rotation of shift handle 20, the counterclockwise rotation of toggle plate 232 causes toggle plate linkage attachment point 110 to return to the position it occupied when the shift handle 20 was in the neutral position. Thus, placing the shift handle 20 in park causes the transmission 23 to be shifted to its neutral setting.

Counterclockwise rotation of shift handle 20 from the park position to the reverse position causes gate pinion gear 235 to rotate in the clockwise direction until it disengages with gate internal gear rack 229. The toggle pinion 236 also rotates in its clockwise direction, causing the toggle plate 232 to rotate in the clockwise direction. Despite the counterclockwise rotation of shift handle 20, the clockwise rotation of toggle plate 232 causes toggle plate linkage attachment point 110 to return to the reverse position, thereby shifting the transmission 23 to its reverse setting.

Although this invention has been described in terms of certain preferred embodiments, other embodiments that will now be apparent to those of ordinary skill in the art are also within the scope of this invention. A number of arrangements other than the cam pin and gear rack embodiments disclosed herein may be used to effect this invention, including toggle levers, cam slot and bell crank, and over-center arrangements. Accordingly, the scope of the invention is intended to be defined only by the appended claims.

What is claimed is:

1. A shift selector mechanism having a drive position, a neutral position, a reverse position and a park position for use in a vehicle with an engine, a brake and an automatic transmission having a drive setting, a neutral setting, and a reverse setting, comprising:
   a selector for choosing a transmission setting;
   a linkage member connected to said transmission to move the transmission to its settings; and
   a motion translator connecting said selector to said linkage member in a manner so that selection of the drive position engages the transmission drive setting, selection of the neutral position engages the transmission neutral setting, moving the selector in a first direction from the neutral position to the reverse position moves the linkage member in a second direction to engage the transmission reverse setting, and moving the selector in said first direction from the reverse position to the park position moves the linkage member in a third direction opposite said second direction to engage the transmission neutral setting.

2. The shift selector mechanism of claim 1, wherein said selector comprises a shift handle rotatable about a first axis, and wherein said motion translator comprises a toggle plate attached to the linkage member rotatable about said axis and connected to said shift handle so that rotation of said shift handle between any two of the drive, reverse or neutral positions is translated into corresponding rotation of the toggle plate and corresponding movement of said linkage member, and so that rotation of said shift handle between the park position and one of the drive, reverse or neutral positions is translated into the opposite rotation of the toggle plate, and so that movement of said linkage member causes shifting of the transmission.

3. A shift selector mechanism having a drive position, a neutral position, a reverse position and a park position for use in a vehicle with an engine, a brake and an automatic transmission having a drive setting, a neutral setting, and a reverse setting, comprising:
   a selector for choosing a transmission setting, wherein said selector comprises a shift handle rotatable about a first axis;
   a linkage member connected to said transmission to move the transmission to its settings; and
   a motion translator connecting said selector to said linkage member in a manner so that selection of the drive position engages the transmission drive setting, selection of the neutral position engages the transmission neutral setting, moving the selector from the neutral position to the reverse position moves the transmission member in one direction to engage the transmission reverse setting, and moving the selector to the park position moves the linkage member in the opposite direction to engage the transmission neutral setting, wherein said motion translator comprises:

a toggle plate attached to the linkage member rotatable about said axis and connected to said shift handle so that rotation of said shift handle between any two of the drive, reverse or neutral positions is translated into corresponding rotation of the toggle plate and corresponding movement of said linkage member, so that rotation of said shift handle between the park position and one of the drive, reverse or neutral positions is translated into the opposite rotation of the toggle plate, and so that movement of said linkage member causes shifting of the transmission;

a cam follower pin; and a cam, fixed relative to said shift handle and said toggle plate, having an arcuate portion circumferentially arranged about the axis and a radial portion extending from a first end of the arcuate portion radially toward the axis, and wherein said shift handle has a slot and said toggle plate has a slot, said cam and slots being engaged by said cam follower pin so that movement of said shift handle into or out of park position causes said cam follower pin to change positions between the cam arcuate and radial portions and change position in said slots.

4. A shift selector mechanism having a drive position, a neutral position, a reverse position and a park position for use in a vehicle with an engine, a brake and an automatic transmission having a drive setting, a neutral setting, and a reverse setting, comprising:

a selector for choosing a transmission setting, wherein said selector comprises a shift handle rotatable about a first axis;

a linkage member connected to said transmission to move the transmission to its settings; and a motion translator connecting said selector to said linkage member in a manner so that selection of the drive position engages the transmission drive setting, selection of the neutral position engages the transmission neutral setting, moving the selector from the neutral position to the reverse position moves the transmission member in one direction to engage the transmission reverse setting, and moving the selector to the park position moves the linkage member in the opposite direction to engage the transmission neutral setting, wherein said motion translator comprises:

a toggle plate attached to the linkage member rotatable about said axis and connected to said shift handle so that rotation of said shift handle between any two of the drive, reverse or neutral positions is translated into corresponding rotation of the toggle plate and corresponding movement of said linkage member, so that rotation of said shift handle between the park position and one of the drive, reverse or neutral positions is translated into the opposite rotation of the toggle plate, and so that movement of said linkage member causes shifting of the transmission, wherein said toggle plate has an arcuate internal gear rack;

a fixed gate having an arcuate internal surface having a smooth portion and a portion defining a gear rack;

a gate pinion gear having a flattened portion on its outer surface attached to said shift handle so that said gate pinion gear rotates about a second axis for selective engagement with the gate internal gear rack and with the gate internal smooth surface; and a toggle pinion gear fixed with respect to said gate pinion gear so that said toggle pinion gear rotates about said second axis along with said gate pinion gear for engagement with the toggle plate gear rack.

5. The shift selector mechanism of claim 4, wherein movement of said shift handle between the drive, neutral and reverse positions causes the flat portion of said gate pinion gear to slide along the gate arcuate internal smooth surface, thereby preventing said gate pinion gear and said toggle pinion gear from rotating about the second axis, fixing said toggle plate in position with respect to said shift handle, and causing said toggle plate to rotate in the same direction of rotation as said shift handle, and movement of said shift handle between the park position and one of the drive, neutral or reverse positions cause the gate pinion gear to engage the gate arcuate internal gear rack, thereby causing rotation of said gate pinion gear and said toggle pinion gear about the second axis, and rotation of said toggle plate about the first axis in a direction of rotation opposite that of said shift handle.

6. The shift selector mechanism of claim 1, including means for causing the selection of the park position to actuate the brake.

7. The shift selector mechanism of claim 1, including means for causing the selection of the park and the neutral positions to allow the engine to be started.

8. A shift selector mechanism for use in a vehicle with an automatic transmission having one or more drive positions, a reverse position and a neutral position, said shift mechanism comprising:

a manually-operated shift handle sequentially movable in a substantially single direction to a drive position, a neutral position, a reverse position and a park position;

a linkage member connected to said transmission to move the transmission to its positions; and means connecting said shift handle to said linkage member in a manner so that when said shift handle is moved into its drive, reverse and neutral positions, the linkage member is moved in one direction and the transmission is placed in its corresponding drive, reverse and neutral positions, and when said shift handle is moved into its park position, said linkage member is moved in the opposite direction, placing the transmission in its neutral position.

9. A shift selector mechanism for use in a vehicle with an automatic transmission having one or more drive positions, a reverse position and a neutral position, said shift mechanism comprising:

a manually-operated shift handle sequentially movable to a drive position, a neutral position, a reverse position and a park position;

a linkage member connected to said transmission to move the transmission to its positions; and means connecting said shift handle to said linkage member in a manner so that when said shift handle is moved into its drive, reverse and neutral positions, the linkage member is moved in one direction and the transmission is placed in its corresponding drive, reverse and neutral positions, and when said shift handle is moved into its park position, said linkage member is moved in the opposite direction placing the transmission in its neutral position, wherein said means for connecting said shift handle to said transmission comprises:

a shaft, said shift handle being rotatably mounted on said shaft for clockwise and counterclockwise rotation;

a toggle plate rotatably attached to said shaft for clockwise and counterclockwise rotation and attached to said linkage member for translating rotation of said toggle plate to shifting said automatic transmission; and means for transmitting clockwise or counterclockwise rotation of said shift handle between any two of the drive, reverse or neutral positions into rotation of said toggle plate in the same direction, and for translating clockwise and counterclockwise rotation of said shift handle between the park position and one of the drive, reverse or neutral positions into rotation of said toggle plate in the opposite direction.

10. A shift selector mechanism for use in a vehicle with an automatic transmission having one or more drive positions, a reverse position and a neutral position, said shift mechanism comprising:

a manually-operated shift handle sequentially movable to a drive position, a neutral position, a reverse position and a park position;

a linkage member connected to said transmission to move the transmission to its positions; and means connecting said shift handle to said linkage member in a manner so that when said shift handle is moved into its drive, reverse and neutral positions, the linkage member is moved in one direction and the transmission is placed in its corresponding drive, reverse and neutral positions, and when said shift handle is moved into its park position, said linkage member is moved in the opposite direction, placing the transmission in its neutral position, wherein said means for connecting said shift handle to said transmission comprises:

a shaft, said shift handle being rotatably mounted on said shaft for clockwise and counterclockwise rotation;

a toggle plate rotatably attached to said shaft for clockwise and counterclockwise rotation and attached to said linkage member for translating rotation of said toggle plate to shifting said automatic transmission; and means for transmitting clockwise or counterclockwise rotation of said shift handle between any two of the drive, reverse or neutral positions into rotation of said toggle plate in the same direction, and for translating clockwise and counterclockwise rotation of said shift handle between the park position and one of the drive, reverse or neutral positions into rotation of said toggle plate in the opposite direction, wherein said means for transmitting rotation comprises:

a cam fixed relative to said shift handle and said toggle plate; and a cam follower pin slidably received by said cam and by said shift handle and toggle plate.

11. The shift mechanism of claim 8, including means responsive to moving said shift handle to the park position actuates a brake which acts on a part of the vehicle other than the transmission for maintaining the position of the vehicle.

12. A shift mechanism for use in a vehicle with an automatic transmission having a drive setting, a reverse setting and a neutral setting, said shift mechanism comprising:

a shaft;

a handle paddle having a plate-like portion with a bore therethrough for rotatably mounting the paddle on said shaft and having a handle extending outwardly with respect to the bore, a slot formed in the lower portion of said paddle outwardly from said bore on the side of the paddle generally opposite from the handle;

a toggle plate rotatably mounted on said shaft adjacent said paddle, a slot formed in the lower portion of said toggle plate partially alignable with said paddle slot;

a cam follower pin extending through said slots so that movement of said handle moves said pin and causes movement of said toggle plate;

a support positioned adjacent to said handle and having a slot formed therein in which said cam pin is positioned so as to be guided by said support slot when said handle is moved, said support slot including an arcuate portion which permits movement of said cam pin through a range of arcuate movement wherein the handle is sequentially movable to a drive position, a neutral position, a reverse position and a park position; and a connector for connecting said toggle plate to said transmission so that movement of said handle into said drive, neutral and reverse positions shifts said transmission to its corresponding settings, said support slot including a radially extending portion adjoining one end of said support slot arcuate portion, said paddle slots and said toggle plate slot being constructed to accommodate radial movement of said cam pin when said handle is moved to its park position causing the cam follower pin to engage the end of said support slot arcuate portion and into said support slot radial portion, such movement of said cam follower pin causing said toggle plate to reverse direction and return to the position it occupied when said transmission is in said neutral setting, whereby said transmission is in a neutral setting when said handle is in a park position.

13. An apparatus, comprising:

a selector movable in one direction between at least first, second and third positions for choosing the setting of a device having at least first and second operating settings; and a motion-translating mechanism connecting said selector to said device in a manner such that moving said selector from its first position into its second position moves said device from its first setting into its second setting, and moving said selector from its second position into its third position returns said device to its first setting, said mechanism includes a member movable with said handle, a guide fixed relative to said selector, an element movably mounted between said selector and said guide and linked to said device, and means interconnecting said selector, said guide and said element, causing said element to move with said selector when said selector is in its first and second positions, and to move in opposite directions of said selector when said selector is moved to its third position.

14. A shift selector mechanism having a drive position, a neutral position, a reverse position and a park position for use in an automatic transmission having a drive setting, a neutral setting and a reverse setting, comprising:
- a shift handle rotatable about a single axis for choosing a transmission setting;
- a linkage member connected to said transmission to move the transmission to its settings;
- a toggle plate attached to the linkage member rotatable about said axis and connected to said shift handle so that rotation of said shift handle between any two of the drive, reverse or neutral positions is translated into corresponding movement of said linkage member, and so that rotation of said shift handle between the park position and one of the drive, reverse or neutral positions is translated into the opposition rotation of the toggle plate, and so that movement of said linkage member causes shifting of the transmission.

15. A shift selector mechanism having a drive position, a neutral position, a reverse position and a park position for use in a vehicle with an engine, a brake and an automatic transmission having a drive setting, a neutral setting, and a reverse setting, comprising:
- a selector movable between said positions for choosing a transmission setting, said selector being arranged so that it must move through the reverse position in moving between the neutral and park positions;
- a linkage member connected to said transmission to move the transmission to its settings; and
- a motion translator connecting said selector to said linkage member in a manner so that selection of the drive position engages the transmission drive setting, selection of the neutral position engages the transmission neutral setting, moving the selector from the neutral position to the reverse position moves the linkage member in one direction to engage the transmission reverse setting, and moving the selector from the reverse position to the park position moves the linkage member in the opposite direction to engage the transmission neutral setting.

16. A method of setting an automatic transmission having one or more drive settings, a neutral setting and a reverse setting, but not having a park setting, with a selector having corresponding drive, neutral and reverse positions together with a park position, comprising the steps of:
- connecting the selector to an automatic transmission in a manner such that sequentially moving the lever in a first direction into the drive, neutral or reverse positions correspondingly and sequentially moves a transmission linkage member in a second direction to move said transmission to respective drive, neutral and reverse settings; and
- connecting said selector to said transmission so that moving the lever in said first direction from the reverse into the park position moves the linkage member in a third direction opposite said second direction to return the transmission to said neutral setting.

17. The method of claim 16, including the step of connecting a brake to said selector so that the brake is set as said handle is moved into said park position even though the transmission is moved to its neutral setting at that position.

18. A method of setting an automatic transmission having one or more drive settings, a neutral setting and a reverse setting, but not having a park setting, with a selector having corresponding drive, neutral and reverse positions together with a park position, the reverse position being located so that the selector must move through the reverse position to move between the neutral and park positions, comprising the steps of:
- connecting the selector to an automatic transmission in a manner such that sequentially moving the lever into the drive, neutral or reverse positions correspondingly and sequentially moves a transmission linkage member in one direction to move said transmission to respective drive, neutral and reverse settings; and
- connecting said selector to said transmission so that moving the lever from the reverse position into the park position moves the linkage member in the opposite direction to return the transmission to said neutral setting.

* * * * *